US007047170B2

(12) United States Patent
Feldman et al.

(10) Patent No.: US 7,047,170 B2
(45) Date of Patent: May 16, 2006

(54) METHOD OF DETERMINING BOUNDARY INTERFACE CHANGES IN A NATURAL RESOURCE DEPOSIT

(75) Inventors: Walter K. Feldman, Smithtown, NY (US); Daniel P. Mazzola, Garden City Park, NY (US)

(73) Assignee: Lockheed Martin Corp., Bethesda, MD (US)

( * ) Notice: Subject to any disclaimer, the term of this patent is extended or adjusted under 35 U.S.C. 154(b) by 707 days.

(21) Appl. No.: 09/833,791

(22) Filed: Apr. 13, 2001

(65) Prior Publication Data

US 2003/0220739 A1 Nov. 27, 2003

Related U.S. Application Data

(60) Provisional application No. 60/197,618, filed on Apr. 14, 2000.

(51) Int. Cl.
*G06G 7/34* (2006.01)
*G01V 1/46* (2006.01)

(52) U.S. Cl. ............................................. 703/10; 702/6
(58) Field of Classification Search .................. 703/10; 73/152.05, 24.05, 152.39; 166/252.1, 250.03; 702/6

See application file for complete search history.

(56) References Cited

U.S. PATENT DOCUMENTS

| 4,916,616 | A | * | 4/1990 | Freedman et al. | ............. | 702/13 |
| 6,005,916 | A | * | 12/1999 | Johnson et al. | ................ | 378/87 |
| 6,125,698 | A | | 10/2000 | Schweitzer et al. | | |
| 6,212,952 | B1 | * | 4/2001 | Schweitzer et al. | ....... | 73/382 G |

OTHER PUBLICATIONS

Nagihara et al, "Three-dimensional Graivity Inversion Based on the Simulated Annealing Algorithm for Constraining Diapiric Roots of Salt Canopies", University of Houston, 1999.*
Lumley, David E., "4-D Seismic Monitoring of Reservoir Fluid-Flow Processes", SPIE Conference, 1994.*
Integrated Geophysics Corporation, "Gravity Gadiometry in Natural Resource Exploration", Footnotes on Interpretation, vol. 4, No. 1, Jun. 1997.*
Maisano et al., "Experimental Investigation of Graivity-Induced Concentration Gradients in Critical Mixtures" 1976 J. Phys. A: Math. Gen., vol. 9, No. 12 Great Britain. p. 2149-2158.*
Davidson et al., "Simulation of the Optimal Combination of Wasate Treatment and Spatially Distributed Discharge of Effluent using Pontryagin's Minimum Principle" Jul. 1974 Annales-de-l-Association-Internationale-pour-le-Calcul-Analogique. p. 15-30.*

* cited by examiner

*Primary Examiner*—Paul L. Rodriguez
*Assistant Examiner*—Tom Stevens
(74) *Attorney, Agent, or Firm*—Wallace G. Walter (57) ABSTRACT

A method of determining changes in the boundary interface in a sub-surface oil reservoir between the to-be-recovered oil and a driveout fluid, such as steam, uses time-displaced gravity gradient measurements to provide an indication of the changes in the gravity gradient over time. The measured data are subject to simulated annealing optimization to find the global minimum that best represents the observed values within the solution space. The optimization process includes establishing an appropriately constrained model of the oil reservoir and a quantized set of mathematically related parameters that define the model. Successive models are perturbed and evaluated from a figure of merit standpoint until a global minimum that best describes the measured time-lapse data is found.

13 Claims, 7 Drawing Sheets

METHOD OF DETERMINING BOUNDARY INTERFACE CHANGES IN A NATURAL RESOURCE DEPOSIT

CROSS REFERENCE TO PROVISIONAL PATENT APPLICATION

This application claims the benefit of the filing date of now abandoned U.S. Provisional Patent Application No. 60/197,618 filed Apr. 14, 2000 by the applicants herein.

BACKGROUND OF THE INVENTION

The present invention relates to a method of determining time-dependent boundary interface changes in a natural resource deposit and, more particularly, to a method by which measurements of the gravity gradient in the area of a natural resource deposit, such as a petroloeum reservoir, can provide information as to reservoir density changes.

Oil and natural gas hydrocarbon reservoirs form as a consequence of the transformation of organic matter into various types of hydrocarbon materials, including coals, tars, oils, and natural gas. It is believed that oil and gas reservoirs form as lighter hydrocarbon molecules percolate toward the surface of the earth until they are trapped in a relatively permeable layer beneath a relatively impermeable layer that 'caps' the permeable layer. The lighter hydrocarbon molecules continue accumulating, often accompanied by water molecules, into relatively large sub-surface reservoirs. Since the reservoirs exist at various depths within the earth, they are often under substantial geostatic pressure.

Hydrocarbon resources have been extracted from surface and sub-surface deposits by the mining of solid resources (coal and tars) and by pumping or otherwise removing natural gas and liquid oil from naturally occurring sub-surface deposits.

In the last century, natural gas and oil have been extracted by drilling a borehole into the sub-surface reservoirs. In general, most reservoirs were naturally pressurized by the presence of free natural gas that accumulated above the liquid oil layer and, often, by water that accumulated below the liquid oil layer. Since naturally occurring crude oil has a density lower than that of water (i.e., ranging from 0.7 in the case of 'light' crude oil to 0.9 in the case of 'heavy' crude oil), crude oil accumulates above the water-permeated layer and below the gas-permeated layer. Thus, a borehole terminating within the oil-permeated layer would yield oil that receives its driveout energy from an overlying gas-permeated layer and/or an underlying water-permeated layer.

In general, the 'primary' recovery of crude oil occurs during that period of time that the natural pressurization of a reservoir causes the crude oil to be driven upwardly through the well bore. At some point in the operating life of the reservoir, the naturally occurring pressurization is effectively depleted. Several different methods, known generally as secondary recovery methods, have been developed to extract crude oil after natural pressurization is exhausted. In general, secondary recovery involves re-pressurizing the reservoir with a fluid (i.e., a liquid or a gas) to lower the oil viscosity and/or drive the remaining crude oil in the oil-permeated layer to the surface through one or more wells. The drive fluid is introduced into the reservoir by injection wells which pump the pressurized drive fluid into the reservoir to displace and thereby drive the oil toward and to the producing wells.

Various schemes have been developed for the placement of the injections wells. For example, a line of injection wells can be placed at or adjacent to a known boundary of the reservoir to drive crude oil toward and to the producing wells. As the boundary between the pressurizing fluid advances past the producing wells, those producing wells can be capped or, if desired, converted to injection wells. In another arrangement, injection wells are interspersed between production wells to drive the oil in the oil-permeated layer away from the injection point toward and to immediately adjacent producing wells.

Various fluids, including water at various temperatures, steam, carbon dioxide, and nitrogen, have been used to effect the re-pressurization of the reservoir and the displacement of the desired crude oil from its rock or sand matrix toward the production wells.

In the waterflood technique, water at ambient temperature is injected into a reservoir to drive the oil toward and to the producing wells. The injected water accumulates beneath the crude oil and, in effect, floats the lighter density crude oil upwardly toward and to the borehole of the producing well. In those cases where the oil-permeated layer is relatively thin from a geological perspective and is also confined between two relatively less permeable layers (i.e., an impermeable reservoir ceiling and a more permeable reservoir basement), water is injected at a relatively high pressure and volume to effect an 'edge drive' by which the crude oil is pushed toward the oil producing wells. Sometimes, the injected water is heated to assist in lowering the viscosity of the oil and thereby assist in displacing the crude oil from the pores of the permeable sand or rock. The waterflood technique is also well-suited for driving natural gas entrapped within the pores of relatively low-permeability rock to a producing well.

In the steamflood technique, steam is used to displace or drive oil from the oil bearing sand or rock toward and to the producing wells. The steam, which may initially be superheated, is injected into the oil-permeated layer to cause a re-pressurization of the reservoir. As the steam moves away from its initial injection point, its temperature drops and the quality of the steam decreases with the steam eventually condensing into a hot water layer. Additionally, some of the lighter hydrocarbons may be distilled out of the crude oil as it undergoes displacement at the interface between the steam/hot water and the crude oil. The steam injection can be continuous or on an intermittent start-and-stop basis.

In addition to the use of water and steam to effect reservoir re-pressurization and the driveout of the crude oil toward the production wells, carbon dioxide and nitrogen have also been used for the same purpose.

One problem associated with water, steam, or gas driveout techniques is the identification of the boundary or interface between the driveout fluid and the crude oil. In an optimum situation, the boundary between the driveout fluid and the to-be-displaced crude oil would move in a predictable manner through the reservoir from the injection points to the production wells to maximize the production of crude oil. The geology of a reservoir is generally complex and non-homogeneous and often contains regions or zones of relatively higher permeability sand or rock; these higher permeability zones can function as low-impedance pathways for the pressurized driveout fluid. The pressurized driveout fluid sometimes forms low-impedance channels, known as 'theft' zones, through which the pressurized fluid "punches through" to a producing well to thereby greatly decrease the recovery efficiency.

The ability to identify the position of and the often indistinct interface or boundary between the to-be-displaced crude oil and the pressurized driveout fluid, to track the velocity and morphology of that boundary, and to effect control thereof would substantially enhance secondary oil recovery.

Various techniques have been developed for gaining an understanding of the configuration of the sub-surface geology of an oil-containing reservoir. The dominant technique involves seismic echoing in which a pressure wave is directed downwardly into the sub-surface strata. The initial interrogation wave energy is typically created by the detonation of explosives or by specialized earth-impacting machines. The interrogation wave radiates from its source point with its transmission velocity affected by the elastic modulus and density of the material through which it passes. As with all wave energy, the interrogation wave is subject to reflection, refraction, scattering, absorption, and dampening effects caused by the material through which it passes and from which it is reflected. The reflected wave energy is detected by geophones spaced from the seismic source point and subjected to processing to yield a model of the reservoir. This technique is highly developed and well-suited for detecting sub-surface structures that may be favorable to the accumulation of oil or gas.

Other techniques for investigating sub-surface geology include the use of gravimeters to detect minute changes in the magnitude of the gravity vector for the purpose of detecting sub-surface structures that may be favorable to the accumulation of oil or gas.

U.S. Pat. No. 6,152,226 issued Nov. 28, 2000 to Talwani, Feldman, and Schweitzer and in common assignment herewith discloses the use of gravity gradiometers to obtain information as to the gravity gradient at various data-taking positions on the surface above an oil reservoir and the use of a subsequent set or sets of data to detect the location and morphology of the boundary or interface between the pressurized driveout fluid and the oil or natural gas in those reservoirs undergoing secondary recovery. The data can be subject to inversion processing in an effort to determine changes in the sub-surface density; however, inversion techniques can result in a sub-optimum local minimum rather than the desired global minimum. The efficient processing of the data can provide information for a manager to more efficiently direct the application of any driveout fluids to optimize recovery from both a time and economic standpoint.

SUMMARY OF THE INVENTION

The present invention provides a method of determining boundary interface changes in a natural resource deposit, such as a sub-surface oil reservoir, using time-lapse gravity gradient measurements and simulated annealing optimization to find the global minimum within the solution space that best represents the observed values. A pluralilty of observations points is established relative to the natural resource deposit and gravity gradiometric measurements are taken at each observation point to provide a first observed data set. Thereafter and after the lapse of a period of time, a second set of measurements is similarly taken to provide a second observed data set and the time-lapse data set representative of the difference between the first and subsequent observed data sets. A model of the reservoir changes, including constraints, is established with a set of quantized mathematically related parameters defining at least the density features of the reservoir. That initial model is evaluated for a figure of merit and thereafter perturbed to establish a second model having a respective figure of merit. A subsequently established model is accepted as the next to-be-perturbed model if its figure of merit is either more optimal relative to the immediately preceding model and accepted if less optimal in accordance with a probability function that varies in accordance with a control parameter. The perturbing process is repeated while a control parameter decreases the probability function with successive repetitions until a predetermined stopping function is met.

BRIEF DESCRIPTION OF THE DRAWING

The present invention is described below, by way of example, with reference to the accompanying drawings, wherein.

DESCRIPTION OF THE PREFERRED EMBODIMENT

Figure 1:
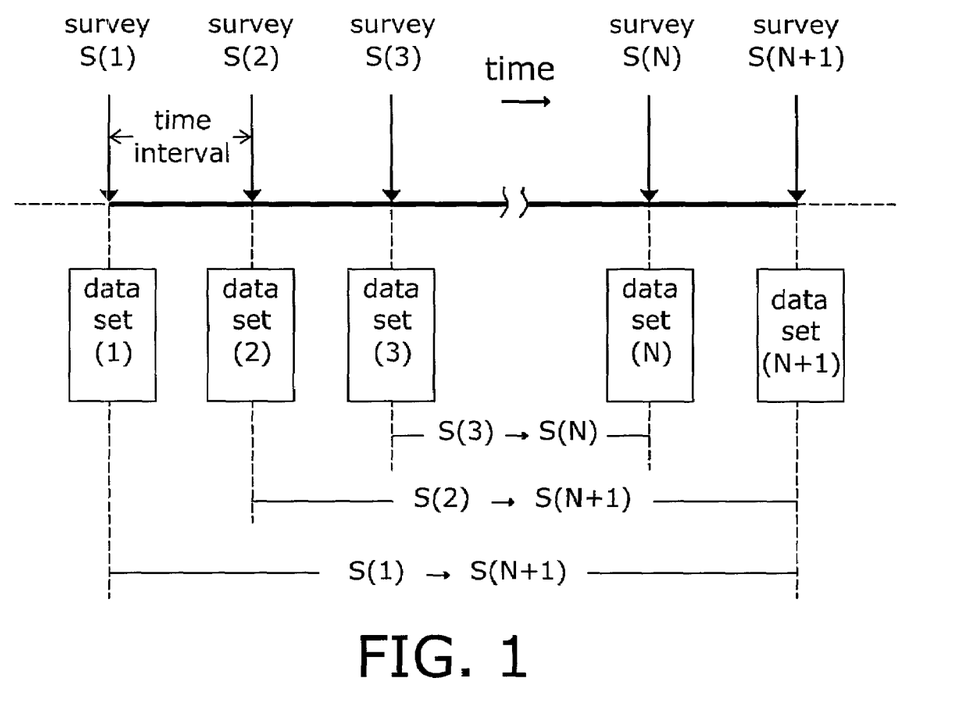
FIG. 1 is a schematic representation of time-displaced gradiometer surveys and their respective data sets.

In the preferred embodiment, the present invention is utilized in the context of plural time-separated sets of gravity gradiometer measurements taken relative to an oil reservoir undergoing secondary oil recovery consequent to the injection of steam, hot water, and/or other fluids via injection wells to cause the injected fluid to drive the oil toward and to an output well or wells. In general, a number of observation points are established on the oil field under survey; it is important that the location of the observation points be fixed for the period of the first and subsequent surveys. A gravity gradiometer, as described in the aforementioned commonly assigned U.S. Pat. No. 6,152,226 (incorporated herein by reference), is located at a first observation point. The gravity gradiometer then takes data at the observation station for some period of time sufficient to insure the reliability of gravity gradient data. Thereafter, the gravity gradiometer is moved to the next successive measurement point and measurements taken at that next successive measurement point. The process is repeated until data are taken at all observation points to provide, as shown in FIG. 1, a first data set DS(1).

A period of time (measured in weeks, months, or years) is allowed to lapse during which time the oil field undergoes continuous or non-continuous pressurization by the injected driveout fluid to cause migration of the boundary or interface between the driveout fluid and the oil to be recovered. The driveout fluid can take the form of steam and/or heated water, nitrogen, or carbon dioxide. As used herein, the application of steam as the driveout fluid encompasses the aforementioned fluids. After the inter-test period has elapsed, the test sequence is repeated to yield another, second data set DS(2) of data. As can be appreciated and as represented in FIG. 1, a third data set DS(3), an Nth data set DS(N), and a further data set DS(N+1) can be taken. In addition to data available from two successive data sets, composite data can be obtained from two non-successive data sets.

In general, an arbitrary mass distribution, such as an underground oil reservoir, gives rise to a scalar gravity potential field U whose value at the point (x,y,z) is denoted U(x,y,z). The gradient of U at each point x,y,z is the gravity vector at that point as presented by $$g(x, y, z) = \begin{bmatrix} U_x \\ U_y \\ U_z \end{bmatrix} = \begin{bmatrix} \partial U/\partial x \\ \partial U/\partial y \\ \partial U/\partial z \end{bmatrix}$$

and the directional derivative of g is the symmetric gravity gradient tensor represented by $$\Gamma(x, y, z) = \begin{bmatrix} U_{xx} & U_{xy} & U_{xz} \\ U_{yx} & U_{yy} & U_{yz} \\ U_{zx} & U_{zy} & U_{zz} \end{bmatrix} =$$

$$\begin{bmatrix} \partial^2 U/\partial x^2 & \partial^2 U/\partial x \partial y & \partial^2 U/\partial x \partial z \\ \partial^2 U/\partial y \partial x & \partial^2 U/\partial y^2 & \partial^2 U/\partial y \partial z \\ \partial^2 U/\partial z \partial x & \partial^2 U/\partial z \partial y & \partial^2 U/\partial z^2 \end{bmatrix}$$

At each point on an equipotential surface of a gravity potential field, the quantities, $U_{xx}-U_{yy}$ and $2U_{xy}$, derived from the elements of the gravity gradient tensor, characterize the curvature or shape of the surface, and hence provide a measure of the underlying mass distribution.

Thus, the above-described surveys symbolically presented in FIG. 1 provide plural sets of measurements of $U_{xx}-U_{yy}$ and $2U_{xy}$, separated by a sufficient time, that characterize the mass density changes of the reservoir for each pair of measurement sets. The differences between the measurement sets quantify the changes in the curvature of the equipotential surface during the time period between surveys. As described below, the differences between the different data sets provide information as to the changes in the location and morphology of the interface between the to-be-recovered oil and the driveout fluid.

The data sets obtained during each survey are indicative of the changes in the underlying density distribution in the field; the data sets, however, do not directly indicate that density distribution. As can be appreciated, many different changes of sub-surface density distributions can give rise to a particular data set.

Figure 2:
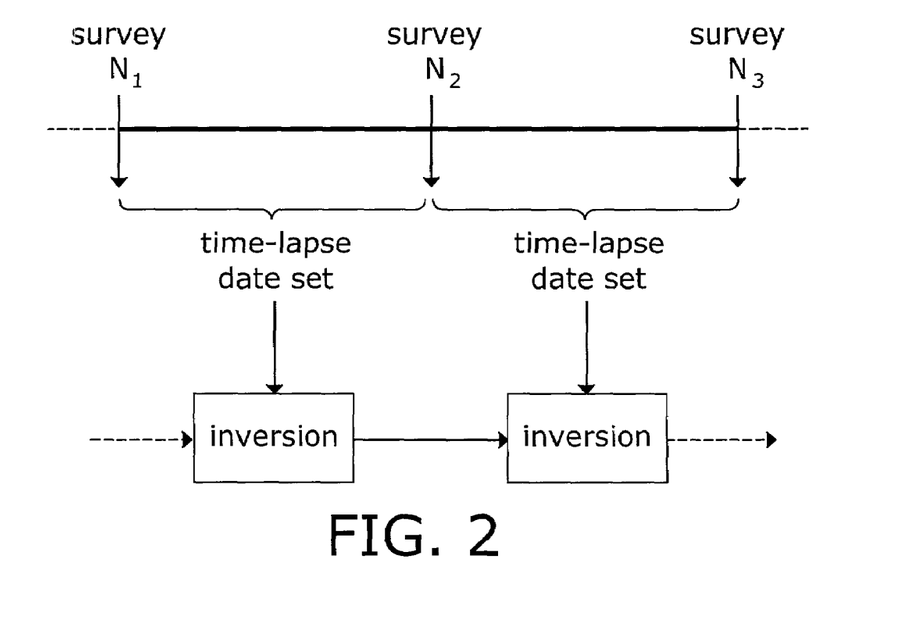
FIG. 2 is a schematic representation of an iterative inversion process.

The method of the present invention, as schematically represented in FIG. 2, utilizes an 'inversion' process to determine the causation of the observed effect. Thus and in the context of the present invention, the inversion method herein determines the changes to the mass distribution that gave rise to the differences/changes between the various data sets. The inversion process is an iterative process that leads to a desired solution, as explained in more detail below in relationship to FIGS. 4 and 10.

The use of time-lapse gravity measurements as inputs to the inverse gravity method of the present invention eliminates the mass contributions of time-invariant geological and physical features. Time-invariant features can include, for example, geologic formations and man-made structures sufficiently near to the observation points to contribute the gradiometer measurements. Thus, the 'inversion' solution limits the search to that portion of the mass which changed between the measurements, principally in response to the pressurized driveout fluid. Inversion of time-lapse gravity data is termed "4D inversion" to differentiate it from "3D gravity inversion," which attempts to identify all geophysical features from a single set of measurements.

The injection of steam, hot water, and/or other fluid into oil reservoirs in the thermal enhanced oil recovery (i.e., secondary oil recovery) processes changes the amounts of steam, oil, and water in the affected regions of the reservoir. These changing proportions of materials of different densities cause sub-surface density changes which can be observed in time-lapse gravity measurements.

As shown in FIG. 1 the initial survey (S1) establishes a measurement baseline. After the time-displaced second survey (S2), a time-lapse data set can be formed, and a first inversion performed (as represented in FIG. 2). Each subsequent survey is used to form a new incremental time-lapse data set representing changes over the survey interval, or to form a composite time-lapse data set representing changes over several survey intervals. As shown in FIG. 2, the inversion of an incremental or composite time-lapse data set is initiated with the results of the inversion whose time-lapse data-set input final survey is the initial survey of that data set. Inversion of the initial incremental or composite time-lapse data set is initialized with an all-zero estimate (no reservoir density changes), or with a random assignment of reservoir density changes.

The disclosed method uses a form of the simulated annealing optimization presented in Metropolis, N., Rosenbluth, A., Rosenbluth, M., Teller, A., and Teller, E., 1953, Equation of State Calculations by Fast Computing Machines, J. Chem. Phys., 21, 1087–1092, and Kirkpatrick, S., Gelatt, C. D.,Jr., and Vecchi, M. P., 1983, Optimization by Simulated Annealing, Science, 220,671–680. The use of simulated annealing methods in geophysical inversion problems is discussed in Sen, M. and Stoffa, P., Global Optimization Methods in Geophysical Inversion, Elsevier Science B. V., 1995, and a description of simulated annealing and procedure for 3D inversion of gravity anomaly data to locate diapiric salt roots is presented in Nagihara, S., Urizar, C., and Hall, S. A., "Three-Dimensional Gravity Inversion Based On The Simulated Annealing Algorithm For Constraining Diapiric Roots Of Salt Canopies," 69th Annual Meeting, Society of Exploration Geophysicists, 31 October–5 November 1999, Houston, Tex.

Figure 3:
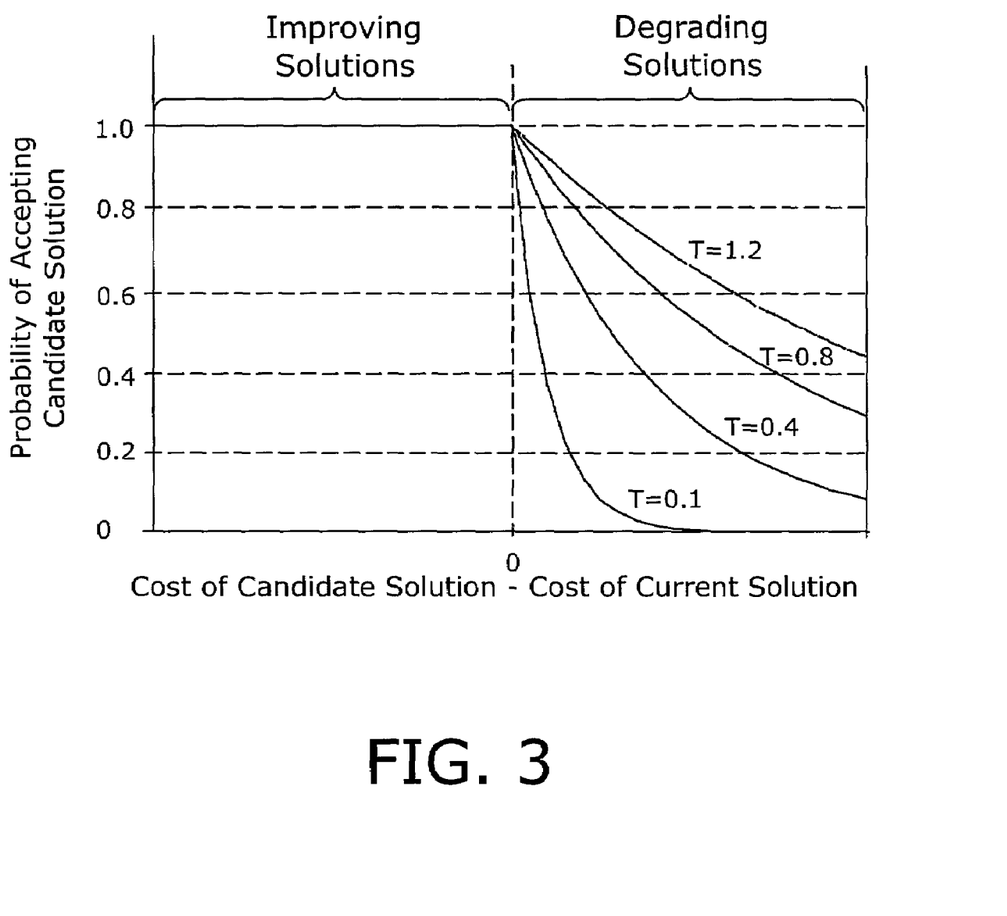
FIG. 3 is a graphical representation of the relationship between the probability of accepting a candidate solution (vertical or y-axis) and the associated costs (horizontal or x-axis) for the candidate and the current solution.

In general, simulated annealing is an optimization technique based upon anologies with the physical process of annealing by which a material undergoes extended heating and is thereafter slowly cooled. The simulated annealing technique exploits parallels between computer simulations of the annealing process, wherein a solid is heated and then gradually cooled to a minimum energy state, and optimization problems, wherein a set of system parameter values which minimizes an energy-like objective, cost function, or figure of merit is sought. The parameter set in the optimization problem corresponds to the particles that comprise the solid in the annealing process, and the values assigned to those parameters to form a candidate solution correspond to the states of the respective particles. The value of the objective function for a candidate solution in the optimization problem corresponds to the energy level in the annealing process. A desired global minimum in the optimization problem corresponds to a minimum energy state in the annealing process. A control parameter in the optimization algorithm plays the role of the temperature in the annealing process. This control parameter is used to control the probability of accepting a candidate solution in a manner that parallels the possible occurrence of non-minimum-energy states in the annealing process. Candidate solutions with costs lower than the current solution are accepted with probability one. Candidates with higher costs are not rejected, but are accepted with a probability that lies between zero and one, and that decreases as the value of the control parameter decreases (just as high-energy states become less likely as the solid cools). FIG. 3 illustrates the effect of a typical implementation of the control parameter (denoted by T) on the solution-acceptance probability. By accepting all improvements and some degradations, the simulated annealing technique can avoid local minimums in its search for a sought-after global minimum. Terminology as used in simulated annealing optimization is used herein.

Figure 4:
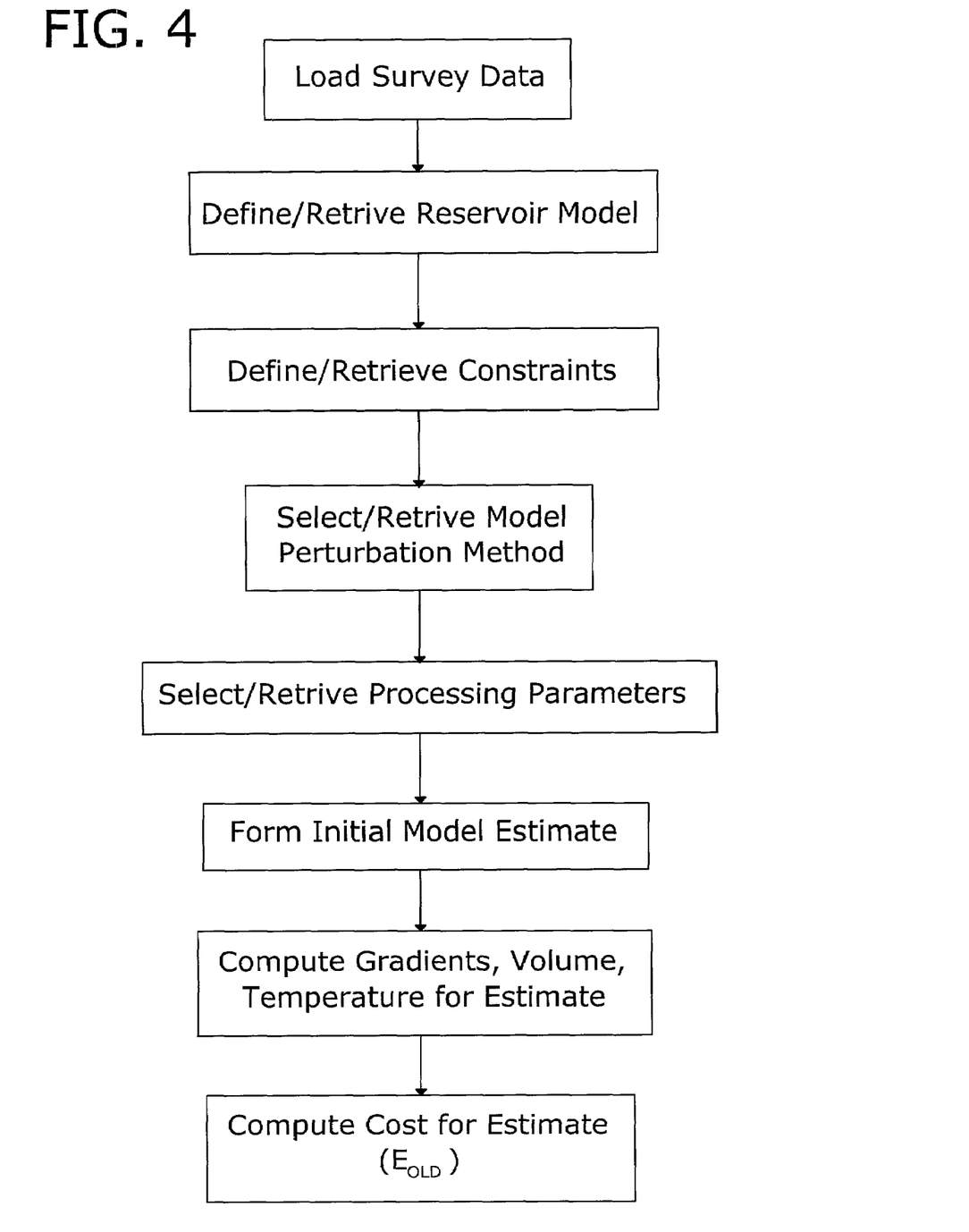
FIG. 4 is a flow diagram representing the initialization of the inversion process.
Figure 10:
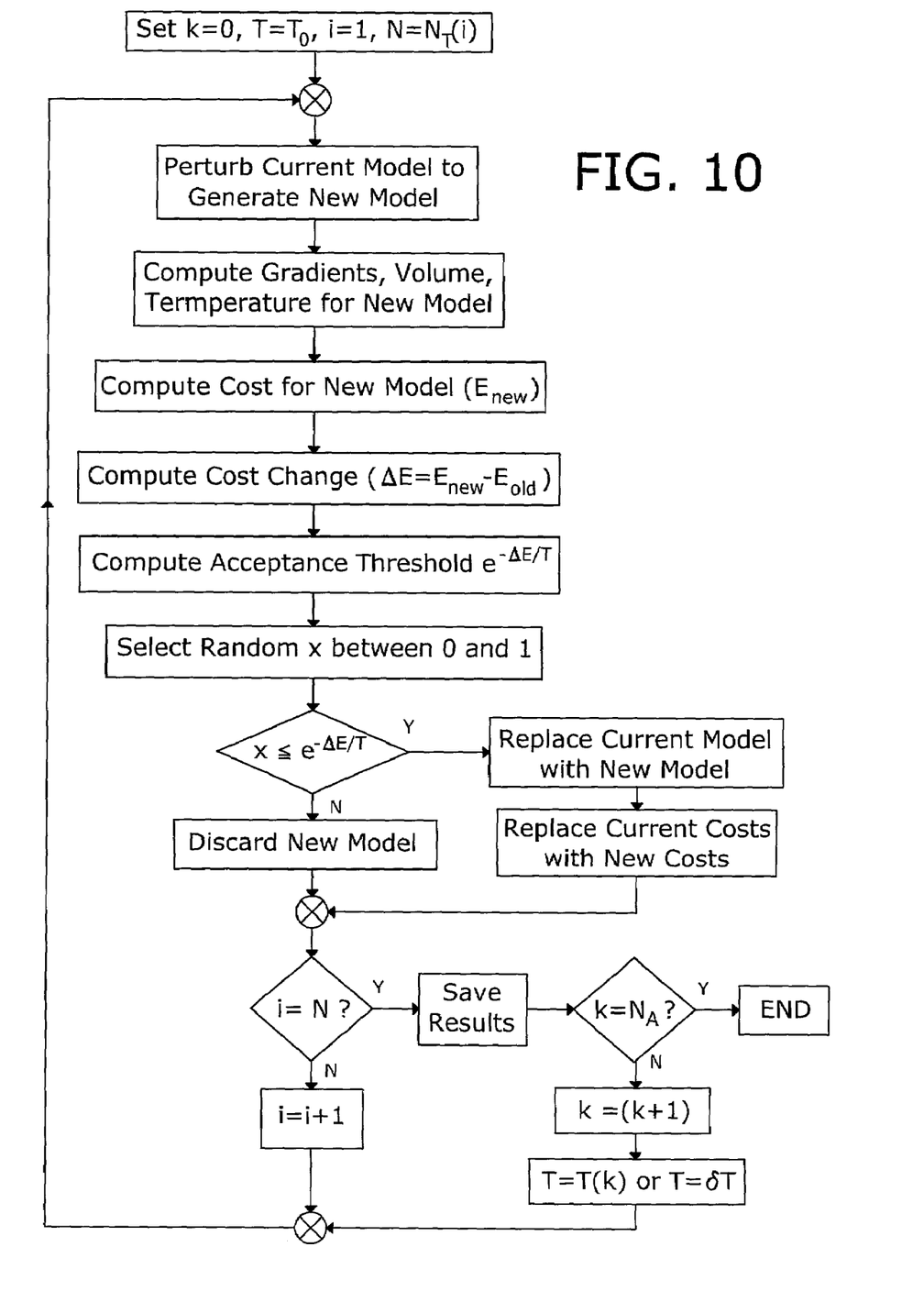
FIG. 10 is a detailed flow diagram illustrating the inversion search process.

FIG. 4 is a process flow diagram illustrating the steps to effect initialization of the presently disclosed method; the inversion search process is shown in FIG. 10. As shown in FIG. 4, the process is initiated by entering (i.e., loading) a new time-lapse data set or by retrieving a previously-stored time-lapse data set from a file, defining a new reservoir model or retrieving a previously-defined reservoir model from a file, defining or retrieving applicable constraints, selecting a model-perturbation method, assigning values to algorithm parameters, forming an initial estimate, computing the gradients and curvatures corresponding to that initial estimate, and determining the cost associated with the initial estimate. The individual steps in the initialization are described below.

Time-lapse data sets are entered manually or retrieved from storage. As mentioned above, the formation of one time-lapse data set requires two measurements at each site, separated by a sufficient period of time. Survey data consist of the three-dimensional position coordinates of each measurement site, the time-lapse gravity gradient data measured at that site, and the time between the two measurements used to form the time-lapse difference. The pertinent time-lapse gravity gradient data are the two components of curvature, $U_{xx}-U_{yy}$ and $2U_{xy}$, so each survey datum consists of six quantities.

Figure 5:
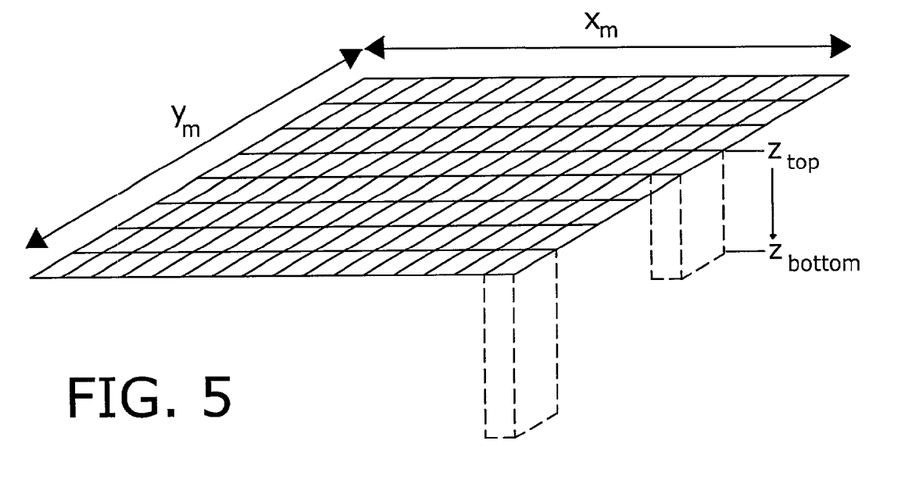
FIG. 5 is a two-dimensional variable-depth reservoir model that uses a column structure.
Figure 6:
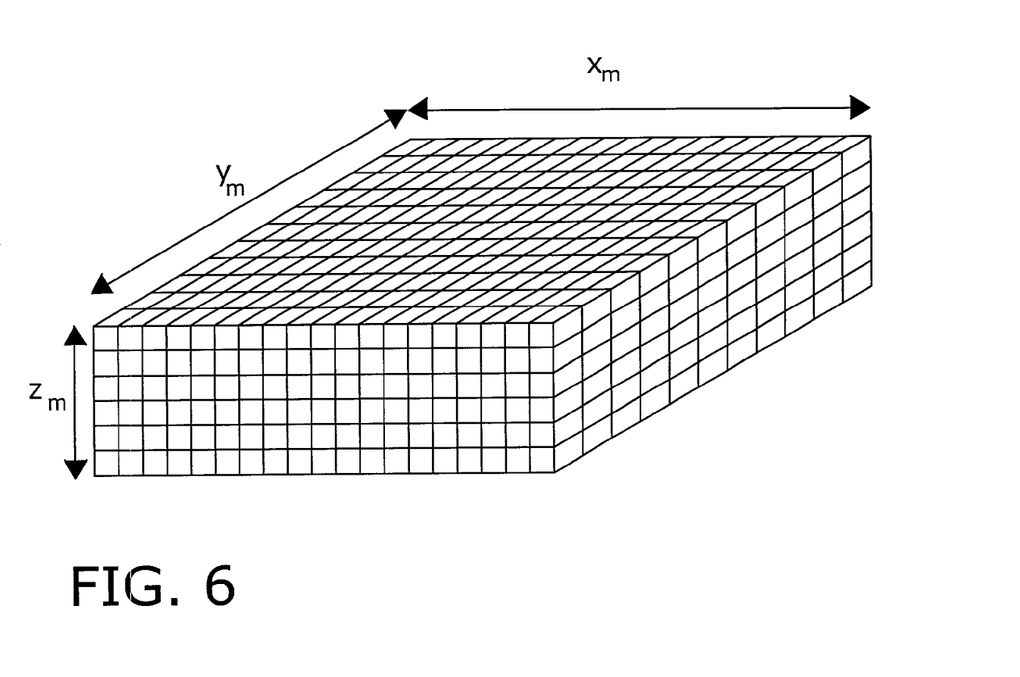
FIG. 6 is a right parallelipiped reservoir model of vertically-stacked prisms or cells.

The disclosed method allows the user to select one of two types of reservoir model structures, shown schematically in FIGS. 5 and 6, to form a three-dimensional discretized reservoir model. The first model, as shown in FIG. 5, is a two-dimensional variable-depth model that uses a column structure; a two-dimensional grid with coordinates identified by $(x_m, y_m)$ pairs is used to define the horizontal extent of the reservoir. The vertical extent of the reservoir is defined by specifying the depths of the top $(Z_{TOP})$ and bottom $(Z_{BOTTOM})$ of the reservoir, and can be partitioned into separate zones. This model may be used when the regions of each vertical reservoir zone that are affected by driveout fluid injection can be taken to be constrained to extend downward from the upper boundary of that zone. The portion of each zone affected by steam injection is then specified by assigning a depth to each horizontal coordinate pair, with the assigned depth denoting the downward vertical extent of the affected region below the zone top.

The second model, as shown in FIG. 6, is the more general model and appears as a right parallelipiped of vertically-stacked prisms or cells arranged pursuant to a three-dimensional rectangular grid. The vertices are determined by a three-dimensional grid with coordinates defined by $(x_m, y_m, z_m)$ triples, to define the entire three-dimensional extent of the reservoir. The ranges of the $x_m$ and $y_m$ coordinates are selected to cover the horizontal extent of the oil reservoir. The $x_m$ and $y_m$ grid ranges and spacings are selected independently by the user. The range of the third $(z_m)$ coordinate defines the vertical extent of the oil reservoir. The range of the vertical coordinate can be uniform over the horizontal extent of the reservoir, or can vary with horizontal position, and the vertical grid spacing need not be uniform and may vary with depth. The reservoir can be partitioned into independent vertical zones by identifying the zm coordinates of each zone. The individual prisms or cells (i.e., volume elements) are identified by their coordinates, and the portion of the reservoir affected by driveout fluid injection is specified by identifying the affected volume elements. Constraints on the nature of the regions of the reservoir that are affected by steam injection can be imposed by restricting the volume elements selected; there are no inherent model constraints (as there are in the two-dimensional variable-depth model of FIG. 5).

Each volume element of the selected reservoir model (i.e., the FIG. 5 model or the FIG. 6 model) is considered to be composed of porous rock that admits a mix of oil, steam, and water. The amounts of oil, steam, and water in a volume element, which vary as the injected steam propagates through the reservoir, are described by the respective saturation levels $\sigma_o(t)$, $\sigma_s(t)$, and $\sigma_w(t)$. The composite density $\rho_c(t_N)$ of a volume element at measurement time $t_N$ is a function of these saturation levels at that time, and of the respective densities of the oil, steam, and water, denoted by $\rho_o$, $\rho_s$, and $\rho_w$:

$$\rho_c(t_N)=p(\rho_o\sigma_o(t_N)+\rho_s\sigma_s(t_N)+\rho_w\sigma_w(t_N))+(1-p)\rho_r$$

where p is the porosity of the element and $\rho_r$ is the density of the rock. If the porosity and rock density are taken to be constant, the density change between measurements depends only on the changes in the oil, water, and steam saturation levels:

$$\Delta\rho_c(t_N)=p(\rho_o\Delta\sigma_o(t_N)+\rho_s\Delta\sigma_s(t_N)+\rho_w\Delta\sigma_w(t_N))$$

where each $\Delta\sigma_k(t_N)$, (k=o,s,w), is the change in the respective saturation level since the time of the previous measurement $(t_{N-1})$. The time-lapse change in the mass of each discrete volume element is therefore fully determined by the changes in the levels of steam, oil, and water saturation in that element.

The disclosed method seeks the density changes, represented by the values assigned to the collection of saturation triples $\{\sigma_o,\sigma_s,\sigma_w\}$, which best explain the measured time-lapse changes in curvature. A candidate solution is obtained by assigning values to the collection of saturation triples, and the "goodness" of the candidate is assessed by means of a cost functional which quantifies the difference between the measured curvature and the curvature computed from the candidate. But the relationship between mass distribution and gravity signature is not unique—many distributions can produce the same signature—and the inversion can converge to solutions that conflict with information about the reservoir and the progress of steam propagation that is available from independent sources.

One way to steer the inversion process to avoid unreasonable or undesireable solutions is to use a priori information about the true solution to constrain the allowable candidate solutions. These constraints can be applied directly, by limiting candidate models to those that satisfy the constraints, or indirectly, by allowing models that violate the constraints, but penalizing those models by appending a constraint-violation term to the curvature-mismatch cost functional.

The disclosed method uses a priori information about the reservoir geometry and geological characteristics, and about the volume of steam injected between the two surveys used to form the time-lapse measurement set. The reservoir geometry and geological characteristics are used directly to define the reservoir model and model parameter values, and to specify the type and extent of model perturbations considered. The volume of steam injected over the measurement interval establishes an upper bound on the amount of steam that could have been added to the reservoir. In the disclosed method, the user can select to use this bound directly, by restricting candidate models to those that satisfy the volume constraint, or indirectly, by penalizing violating models.

A second way to avoid unreasonable solutions is to incorporate other non-gravitational measurement data into the process. Other measurement data can be used directly, by computing the model-based value of the measured quantity for each candidate model and appending a model/measurement mismatch term for the quantity to the cost functional, or indirectly, by using the measurements to infer additional constraints on the reservoir or the steam chest within the reservoir (e.g., using borehole temperature measurements to constrain the location of the steam chest and limit model perturbations accordingly).

Successive candidate solutions are obtained by making small changes (i.e., perturbations) to the current solution. A solution is perturbed by modifying the saturation levels for a portion of the total model volume. Each saturation level (oil, water, and steam) is randomly selected either from a continuum of values in predefined allowable ranges, or from a quantized set of values covering the allowable ranges. The method for selecting the volume to be modified depends on the model structure selected.

For the two-dimensional variable-depth model of FIG. 5 (column structure), the volume to be modified is determined by selecting the vertical reservoir zone to be modified; selecting the horizontal footprint of the volume in that zone to be modified; and selecting the downward projection of that horizontal footprint below the upper boundary of the zone.

The vertical reservoir zone is selected randomly. The horizontal footprint is selected in one of three ways:

(1) The grid elements that comprise the horizontal footprint are selected randomly. The number of elements selected may be fixed for all iterations, with the number selected by the user during initialization, or may vary randomly from iteration to iteration, with the range of variation selected by the user during initialization. The elements may be selected from anywhere within the horizontal bounds of the model, or may be constrained to subregions of the model that are randomly selected from iteration to iteration.

(2) The grid elements of the horizontal footprint lie in one or more annular angular segments. The size of the angular segments (between 0° and 360°) is selected during initialization by the user. The number of angular segments may be fixed for all iterations, with the number selected by the user during initialization, or may vary randomly from iteration to iteration, with the range of variation selected by the user during initialization. The outer radius of the annular region within the selected angular segments is selected randomly for each iteration. The inner radius may be selected randomly for each iteration, or set to zero for all iterations.

(3) The grid elements that comprise the horizontal footprint lie in a neighborhood of an element selected randomly at each iteration. The size of the neighborhood (specified by the number of elements in each direction) is selected by the user during initialization.

The extent of the downward projection from the selected horizontal footprint is determined by the random selection of a depth change from among a set of candidate depths changes for the selected vertical reservoir zone, and random selection of the direction (up or down) of the depth change from the current depth of the affected region at those points in that zone. The new depth of the affected region is constrained to remain within the depth limits of the selected zone.

For the three-dimensional grid model of FIG. 6, the volume in which the saturation levels are to be changed is selected in one of three ways:

(1) The individual volume elements that comprise the total volume to be changed are selected randomly. The number of elements selected may be fixed for all iterations, with the number selected by the user during initialization, or may vary randomly from iteration to iteration, with the range of variation selected by the user during initialization. The elements may be selected from anywhere within the horizontal and vertical bounds of the model, or may be constrained horizontally and/or vertically to subregions of the model that are randomly selected from iteration to iteration.

(2) The total volume to be changed lies in a region whose horizontal footprint consists of one or more annular angular segments. The size of the angular segments (between 0° and 360°) is selected during initialization by the user. The number of angular segments may be fixed for all iterations, with the number selected by the user during initialization, or may vary randomly from iteration to iteration, with the range of variation selected by the user during initialization. The outer radius of the annular region within the selected angular segments is selected randomly for each iteration. The inner radius may be selected randomly for each iteration, or set to zero for all iterations. The vertical extent of the annular angular volume to be changed is determined by selecting a single vertical layer or a group of vertical layers of the three-dimensional model. The same inner and outer radii may be used for all selected vertical layers, or the radii may vary randomly from layer to layer within the inner and outer radius constraints of the horizontal footprint. The random variation may be constrained to be monotonically increasing or monotonically decreasing with depth.

(3) The volume elements to be changed lie in a neighborhood of an element selected randomly at each iteration. The size of the neighborhood (specified by the number of volume elements in each direction) is selected by the user during initialization.

Figure 7:
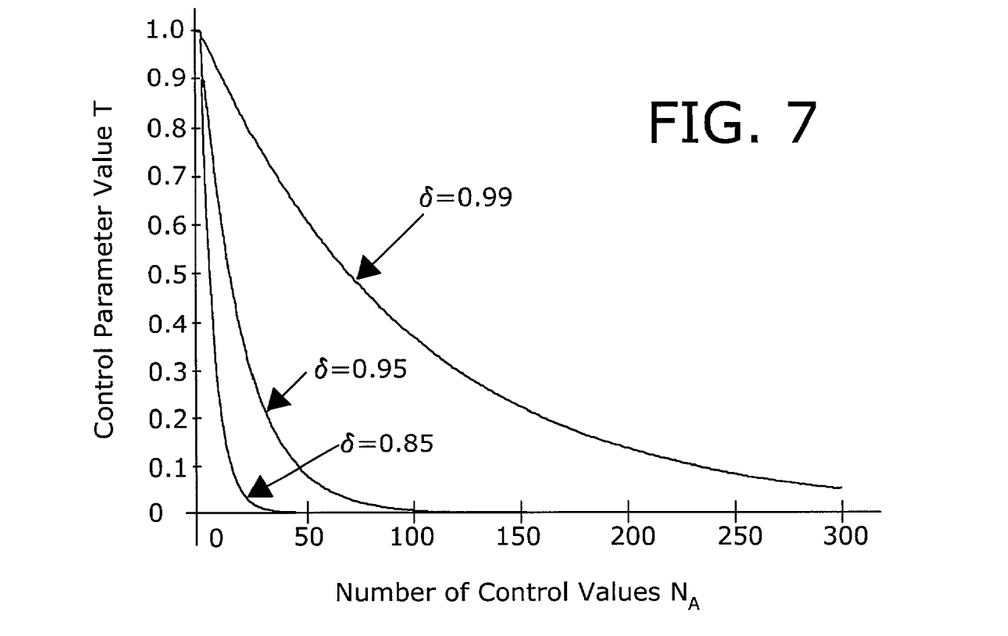
FIG. 7 is a graphical representation of the relationship between a control parameter T (vertical or y-axis) and a number of control values NA (horizontal or x-axis)

The user defines an initial value ($T_o$) and a "cooling schedule" for the simulated annealing algorithm control parameter. The cooling schedule is determined by specifying a control parameter decay rate (b) or by providing a set of control parameter values, and by specifying the number of model perturbations performed (number of solutions tried) at each value of the control parameter $T_i$. If the cooling schedule is specified by a decay rate, the number of steps in the reduction of the control parameter ($N_A$) must be specified, and the control parameter updates are computed as $$T_{k+1} = \delta T_k.$$

FIG. 7 illustrates the control parameter behavior for several values of decay rate 5.

The inversion process starts with an initial estimate. Inversion of the first measured time-lapse data set for a oil reservoir can be initialized with an all-zero estimate (no saturation changes), or with a random assignment of saturation values. Inversions of subsequent time-lapse data sets can use the results of an inversion of an earlier data set as an initial estimate. Inversions can be interrupted to assess results, and re-started from the point of interruption. Interrupted inversions are continued by initializing with the last solution accepted before the interruption. Finally, inputs from parallel inversions can be collected and used to form a single estimate to initialize continued processing.

Figure 8:
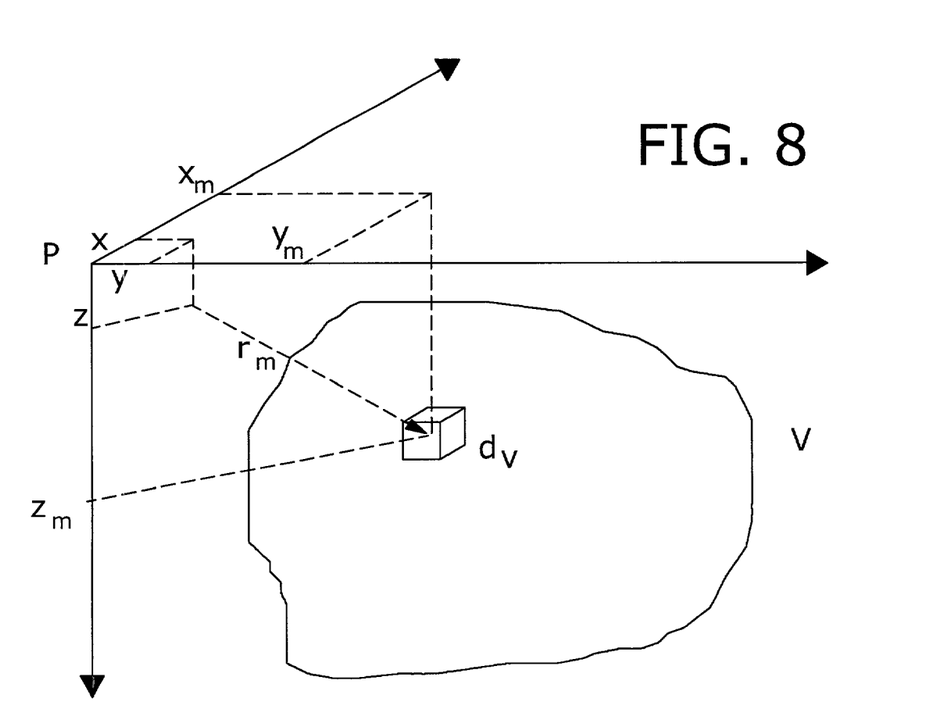
FIG. 8 is a three-dimensional representation of a volume element indicating relation to a typical measurement site.

Once an initial estimate is formed, the necessary gradients are computed at each survey site. The change in potential at a survey site P with coordinates (x,y,z) is $$\Delta U(x, y, z) = G \int_v \frac{\Delta \rho(x_m, y_m, z_m)}{|r_m|} dv$$

where G is the universal gravitational constant ($6.673 \times 10^{-11}$ m$^3$/kg-sec$^2$), $\Delta\rho$ is the change in density in the differential volume element dv, $r_m$ is the radius vector from the survey site P to dv, and the integration is over the reservoir volume, as represented in FIG. 8. The time-lapse gradients are obtained by taking the appropriate second derivatives of the change in potential. For the preferred implementation, the time-lapse gradients needed to compute curvature changes are:

$$U_{xx}(x, y, z) = G \int_v \left[ \frac{3\Delta\rho(x-x_m)^2}{|r_m|^5} - \frac{\Delta\rho}{|r_m|^3} \right] dv$$

$$U_{yy}(x, y, z) = G \int_v \left[ \frac{3\Delta\rho(y-y_m)^2}{|r_m|^5} - \frac{\Delta\rho}{|r_m|^3} \right] dv$$

$$U_{xy}(x, y, z) = G \int_v \left[ \frac{3\Delta\rho(x-x_m)(y-y_m)}{|r_m|^5} \right] dv.$$

Figure 9:
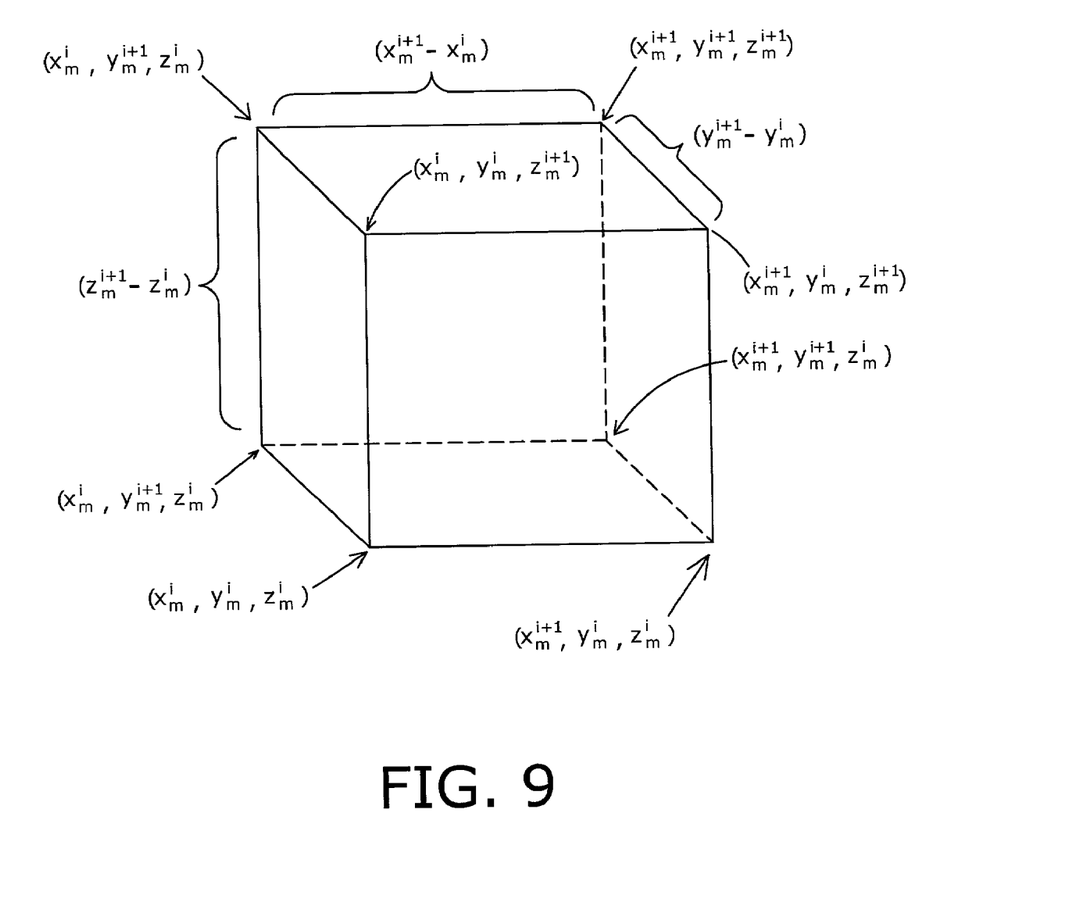
FIG. 9 is a graphical representation of an exemplary volume element.

For the discretized reservoir model, these integrals can be evaluated by evaluating subintegrals over each model volume element and adding the results:

$$U_{xx}(x, y, z) = G \sum_i \int_{v_1} \left[ \frac{3\Delta\rho_i(x-x_m)^2}{|r_m|^5} - \frac{\Delta\rho_i}{|r_m|^3} \right] dv_1$$

$$U_{yy}(x, y, z) = G \sum_i \int_{v_1} \left[ \frac{3\Delta\rho_1(y-y_m)^2}{|r_m|^5} - \frac{\Delta\rho_i}{|r_m|^3} \right] dv_1$$

$$U_{xy}(x, y, z) = G \sum_1 \int_{v_1} \left[ \frac{3\Delta\rho_1(x-x_m)(y-y_m)}{|r_m|^5} \right] dv_1$$

where i ranges over all the volume elements in the model. In the preferred implementation, this sum is restricted by limiting it to those volume elements whose density has been changed by the current model perturbation. For sufficiently small volume elements, these subintegrals can be evaluated by treating each volume element as a point mass located at the center of the element. For the volume element shown in FIG. 9, the total mass change $$\Delta m_{nk}(t_N) = \Delta \rho_{ijk}(t_N) v_{ijk},$$

where $\Delta\rho_{ijk}$ is the density change in the element and $v_{ijk}$ is the element volume $$v_{ijk} = (x_m^{i+1} - x_m^i)(y_m^{j+1} - y_m^j)(z_m^{k-1} - z_m^k)$$

is taken to be located at the center $(x_m^{i*}, y_m^{j*}, z_m^{k*})$ of the volume element:

$$(x_m^{i*}, y_m^{j*}, z_m^{k*}) = \{\tfrac{1}{2}(x_m^i + x_m^{i+1}), \tfrac{1}{2}(y_m^j + y_m^{j+1}), \tfrac{1}{2}(z_m^k + z_m^{k+1})\}.$$

The cost functional is the figure of merit used to assess the "goodness" of a candidate model. The principal component of the cost functional is a measure of the mismatch between the measured gravity quantities and the values of those quantities as computed from the candidate model. In the preferred implementation, the quantities of interest are the two components of curvature at each survey site, denoted $c_1$ and $c_2$:

$$c_1 \leq U_{xx} - U_{yy}$$

$$c_2 = 2U_{xy}.$$

If there are N survey sites, the inversion for the preferred implementation is based on the N measurement pairs $\{c_{1mk}, c_{2mk}\}k=1, \ldots, N$, where the m subscript denotes the measured values of the quantities and the k subscript identifies the survey site. For each candidate model, there is a corresponding set of N computed pairs $\{c_{1ck}, C_{2ck}\}k=1, \ldots, N$, where the c subscript denotes the computed values of the quantities. Every candidate model has N error pairs associated with it, $\{e_{1k}, e_{2k}\}k=1, \ldots, N$, where $e_{jk}$ is the difference between the computed and measured values of $c_j$ at site k:

$$e_{1k} = c_{1ck} - c_{1mk}$$

$$e_{2k} = c_{2ck} - c_{2mk}.$$

The gravity component of the cost functional is $$E_G = \|e\|^2$$

where e is the 2N-element error vector $$e = \begin{bmatrix} e_{1k} \\ e_{2k} \end{bmatrix}_{k=\{1, \ldots, N\}}$$

and $$\|e\|^2 = \sum_{k=1}^{N} (e_{1k}^2 + e_{2k}^2).$$

During initialization, the user selects whether to include in the cost functional a term that depends on the steam volume of the candidate model, and whether to include that volume cost only for models whose volume exceeds the volume constraint, or for all models. (If volume costs are included for all models, models that violate the volume constraint will contribute more to the cost functional than those that satisfy the constraint.) If the volume cost is to be included, the user selects the weight to be applied to the computed model volume. The overall volume weight is a combination of an absolute weight and a weight inversely proportional to the gravity component of the cost functional (so significant volume costs are incurred only after a reasonable gravity match is obtained). If $v_c$ is the volume constraint and $v_m$ is the computed steam volume for the candidate model, the volume component of the cost functional is $$E_v = [1-\gamma+\gamma u(r_v-1)][\alpha+(\beta/\|E_G\|)]r_v$$

where $r_v$ is the ratio of the model volume to the volume constraint $$r_v = v_m/v_c$$

and u(x) is the unit step function $$u(x)=1, x \geq 0$$

$$u(x)=0, x<0.$$

The above equation for the volume component $E_v$ constitutes a penalty function which introduces the volume constraint in a "soft" manner, i.e., "soft" meaning that the constraint can be violated, but only with a cost penalty. The three parameters $\alpha$, $\beta$, and $\gamma$ are used to implement the user selections. If the user chooses not to include the volume cost, all three are set to 0 and the volume cost is disabled. To add a volume cost only when the model volume exceeds the constraint, $\gamma$ is set to 1; otherwise $\gamma$ is set to 0 and all models contribute to the cost functional. $\alpha$ controls the absolute volume weighting, and $\beta$ controls the gravity-cost-dependent weighting. The total cost functional E is the sum of the gravity and volume components:

$$E=E_G+E_v.$$

FIG. 10 illustrates the inversion search process. A new model is generated from the current model by perturbing the current model using one of the perturbation techniques described above. The gradients, volume, and temperatures associated with the new model are computed and compared to the appropriate measurements or constraints to determine the cost associated with the new model ($E_{NEW}$). The difference between the cost associated with the new model and that associated with the old model ($E_{OLD}$), $$\Delta E = E_{NEW} - E_{OLD},$$

is used to compute the acceptance threshold $e^{-\Delta E/T}$. The acceptance threshold is used to determine whether the old model is to be retained or replaced by the new model. A random number x, uniformly distributed between 0 and 1, is selected. If $$x \leq e^{-\Delta E/T},$$

the old model is replaced by the new model; otherwise, the new model is discarded. If $E_{NEW} \leq E_{OLD}$, $\Delta E \leq 0$ and $e^{-\Delta E/T} \geq 1$. Since x is always less than one, new models with lower costs will always be accepted. If $E_{NEW} \geq E_{OLD}$, $\Delta E \geq 0$ and $0 \leq e^{-\Delta E/T} \leq 1$, and $$\text{Prob\{Accepting New Model\}} = \text{Prob}\{x \leq e^{-\Delta E/T}\} = \int_0^{e^{-\Delta E/T}} dx = e^{-\Delta E/T},$$

so new models with higher costs will be accepted with probability $e^{-\Delta E/T}$, which decreases with decreasing T as shown in FIG. 3. After the model acceptance decision has been made, status checks are performed before the next model perturbation. If the specified number of iterations at the current value of the control parameter (T) have been completed, results are saved to allow the inversion to be continued from the current point if the process is interrupted, and the control parameter is updated. If all iterations for all control parameter values have been performed, the inversion is terminated.

The present invention advantageously provides a method of determining boundary interface changes in a natural resource deposit using simulated annealing optimization techniques in which a model is successively perturbed to generate a new model that is tested for acceptability until an optimum model is obtained from the solution space. The present invention in suitable for use in applications involving geothermal monitoring, ground-water hydrology, and environmental remediation.

As will be apparent to those skilled in the art, various changes and modifications may be made to the illustrated method of determining boundary interface changes in a natural resource deposit of the present invention without departing from the spirit and scope of the invention as determined in the appended claims and their legal equivalent.

What is claimed is:

1. A method of determining time-dependent changes in sub-surface density of a natural resource reservoir, comprising the steps of:

measuring a set of time-lapse gravity gradient data for a sub-surface natural resource deposit characterized by a change in a density characteristic over time;

creating a model of the change in density of the reservoir having a plurality of volume elements therein, including constraints on the model;

establishing a set of quantized mathematically related parameters defining the density model and computing at least gravity gradients for that quantized model and computing a corresponding figure of merit therefor;

perturbing at least one parameter of the model and recalculating the figure of merit for the perturbed model;

evaluating the figure of merit for the perturbed model relative to that of the immediately preceding model and accepting the perturbed model if more optimal relative to the immediately preceding model and accepting the perturbed model if less optimal in accordance with a probability function that varies in accordance with a control parameter; and repeating the perturbing and evaluation steps while the control parameter decreases the probability function with successive repetitions.

2. The method of claim 1, wherein the gravity gradient data includes at least the $U_{xx}-U_{yy}$ and $2U_{xy}$ components.

3. The method of claim 1, wherein the time-lapse data sets include at least the positional coordinates for a plurality of measurement sites, time-lapse gravity gradient data at each site, and the time between measurements.

4. The method of claim 1, wherein the model is a two-dimensional variable-depth column model.

5. The method of claim 1, wherein the model is a right parallelipiped of stacked prisms arranged in a rectangular grid pattern.

6. The method of claim 1, where said constraints are implemented by a penalty function.

7. A method of identifying the boundary or interface between a driveout fluid and to-be-recovered oil in a sub-surface oil reservoir undergoing secondary oil recovery, comprising the steps of:

measuring the gravity gradient at a plurality of observation sites associated with the oil reservoir over a period of time to obtain time-displaced gravity gradients associated with each observation site;

creating a change of density model of the oil reservoir having a plurality of volume elements therein, including constraints on the model;

establishing a set of quantized mathematically related parameters defining the density model and computing at least gravity gradients for that quantized model and computing a corresponding figure of merit therefor;

perturbing at least one parameter of the model and recalculating the figure of merit for the perturbed model;

evaluating the figure of merit for the perturbed model relative to that of the immediately preceding model and accepting the perturbed model if more optimal relative to the immediately preceding model and accepting the perturbed model if less optimal in accordance with a probability function that varies in accordance with a control parameter; and repeating the perturbing and evaluation steps while the control parameter decreases the probability function with successive repetitions.

8. The method of claim 7, wherein the gravity gradient data includes at least the $U_{xx}-U_{yy}$ and $2U_{xy}$ components.

9. The method of claim 7, wherein the time-lapse data sets include at least the positional coordinates for a plurality of observation sites, time-lapse gravity gradient data at each site, and the time between measurements.

10. The method of claim 7, wherein the model is a two-dimensional model defining a rectangular array of columns, each having a depth variable, each columns defining a volume element.

11. The method of claim 7, wherein the model is a right parallelipiped of stacked prisms arranged in a rectangular grid pattern, each prism defining a volume element.

12. The method of claim 7, wherein the set of quantized mathematically related parameters are functionally related to the changes in saturation of the oil and the driveout fluid in each volume element.

13. The method of claim 7, where said constraints are implemented by a penalty function.

* * * * *